W. A. Jordan,
Brick Machine.
Nº 15,766.          Patented Sep. 23, 1856.
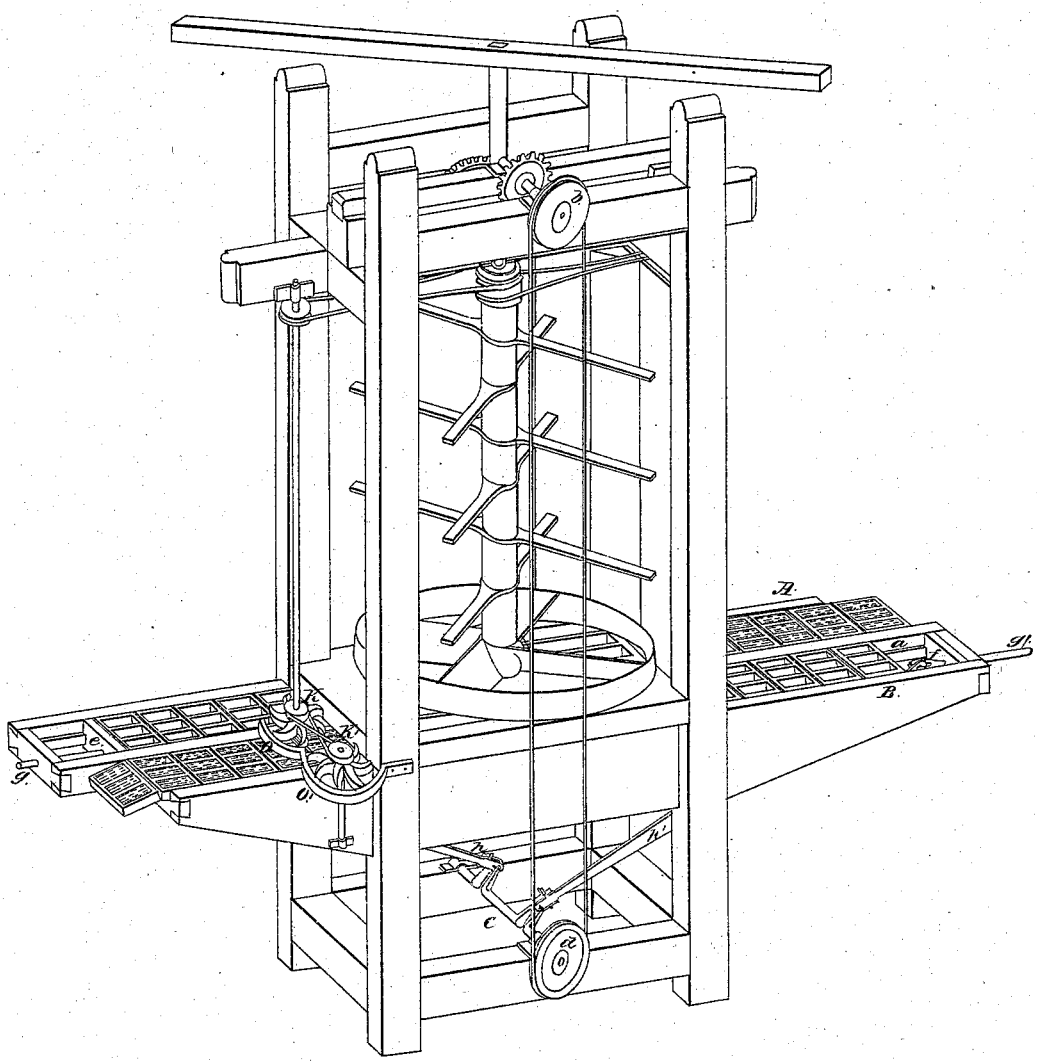

UNITED STATES PATENT OFFICE.

WILLIAM A. JORDAN, OF THIBODAUX, LOUISIANA.

BRICK-MACHINE.

Specification of Letters Patent No. 15,766, dated September 23, 1856.

*To all whom it may concern:*

Be it known that I, WILLIAM A. JORDAN, of Thibodaux, in the parish of Lafourche and State of Louisiana, have invented certain new and useful Improvements in Brick-Machines; and I do hereby declare that the following is a full, clear, and exact description of the construction and operation of the same, reference being had to the accompanying drawings, making a part of this specification.

The nature of my improvement consists in arranging the tables A, and B, shoving heads e, and f, actuated in the manner hereinafter to be described, in combination with the rotary scrapers K, K', and curved guards O, O, said arrangement admitting of the attendant's approach to the end of one of the tables from which the full mold is to be removed, and of depositing an empty mold on the adjacent table in a manner hereafter described, while the rotary scrapers perform the double function of removing the bulge or swell of clay in the mold in a superior manner and of depositing the greater part thereof in the empty mold.

The tempering and mixing of the clay is in the usual manner, that is the clay is moistened with water in a box, then thrown in the hopper, in which the knives or blades revolve and after being properly prepared it is forced through a grate by a revolving screw into the molds under the hopper.

The tables, two in number, A and B, are constructed with rails and guides, so that the molds may be moved correctly thereon; c is a crank shaft placed below the tables. The two cranks on the shaft c are on the same side thereof so as to equalize the strain on the machine by having one shoving head carry the molds forward, while the other shoving head is leaving the mold on the adjacent table and creating a space (a) for receiving an empty mold. Suitable motion is communicated to the crank by a chain or band passing from pulley (b) to (d). From the cranks are pitman rods h h' connecting the shoving heads e, and f, therewith.

g g', are guide rods attached to the shoving heads.

k, k' are rotary scrapers, placed outside of the hopper, circular motion is given them by belts, as indicated in the drawing, and they serve the important office of removing the bulge or swell of the clay in the mold which will rise therein after passing under the fixed scraper (usually employed) attached to the side of the hopper. Also effecting the deposit of nearly all the surplus clay thus removed in the empty mold. The scraper k' turning toward the scraper k, the surplus clay is thus thrown within the revolution of the latter and by it assisted with the curved guards O, O', deposited in the empty mold. The guards O, O', partially encircle the scrapers as shown in the drawing. It will be noticed that the action or operation of the scrapers k, k', is divided, that is while k' removes with a circular motion the excess of clay from half the mold, that of k completes the removal and deposits it in the empty mold. By providing the curb (o',) with a bottom to the overhanging portion thereof, all dropping of clay other than in the mold would be prevented.

The operation is as follows: The attendant approaches a recess, formed by one of the tables projecting beyond the other, and with his left hand deposits an empty mold on the adjoining table while with his right hand he receives the full mold from the table directly in front of him.

The feed of the mill being kept up and clay properly prepared in the hopper, the molds of one table, say of A, are forced toward the right by the shoving head (e) coming in contact with the side of an empty mold placed on said table, while it will be noticed that the shoving head (f) of the adjoining table B, is retreating (on the right hand side) from the mold, by a previous movement carried under the hopper, thus creating a space between the side of the mold and the retreating shoving head for the reception of an empty mold on the right hand side of the machine.

By continuing the turning of the crank the shoving head of the table A retracts, thus leaving a space and the shoving head of B carries its mold under the hopper, thereby enabling each of the workmen on the two sides of the machine, to place an empty mold on his table and offbear a full one with each revolution of the crank shaft.

By my arrangement of reciprocating tables I entirely dispense with the walking from one side of the machine to the other, consequent to the placing the empty mold on one side of the machine and their reception on the other.

In my description I have spoken of a single mold being employed, but of course any number may be used, either in the breadth or length of the tables.

I do not claim broadly the use of double tables or the employment of a rotary scraper as such devices have been used before, but What I do claim as my invention and desire to secure by Letters Patent is, The tables A and B and shoving heads $e$ and $f$, when arranged to operate in relation to each other in the peculiar manner above described, in combination with the rotary scrapers $k$, $k'$, and curved guards O O', the whole being constructed and operated in the manner and for the purposes set forth.

In testimony whereof I have signed my name before two subscribing witnesses.

WILLIAM A. JORDAN.

Witnesses:
   JOHN F. CLARK,
   JOHN S. HOLLINGSHEAD.